United States Patent [19]

Dawidowicz et al.

[11] E Re. 29,571

[45] Reissued Mar. 14, 1978

[54] DISPENSING SYSTEM FOR RAZOR BLADE CARTRIDGES

[75] Inventors: Jan Dawidowicz, Fairfield; Frank A. Ferraro, Trumbull, both of Conn.

[73] Assignee: Warner-Lambert Company, Morris Plains, N.J.

[21] Appl. No.: 538,239

[22] Filed: Jan. 2, 1975

Related U.S. Patent Documents

Reissue of:

[64] Patent No.: 3,834,018
Issued: Sep. 10, 1974
Appl. No.: 399,786
Filed: Sep. 21, 1973

U.S. Applications:

[63] Continuation-in-part of Ser. No. 258,682, Jun. 1, 1972, Pat. No. 3,771,223, which is a continuation-in-part of Ser. No. 236,723, Mar. 21, 1972, Pat. No. 3,785,051.

[51] Int. Cl.[2] ..... B26B 21/24; A45D 27/24

[52] U.S. Cl. ..... 30/40.2; 206/356; 206/359

[58] Field of Search ..... 206/355-360; 30/40, 40.2; 221/66, 102, 279, 220

[56] References Cited

U.S. PATENT DOCUMENTS

| | | | |
|---|---|---|---|
| 2,347,237 | 4/1944 | Benjamin | 206/356 |
| 2,744,317 | 5/1956 | Borden | 30/40.2 X |
| 3,388,831 | 6/1968 | Hansom | 30/40.2 UX |
| 3,696,915 | 10/1972 | Douglas | 30/40 X |
| 3,833,146 | 9/1974 | Braginetz | 221/66 |

OTHER PUBLICATIONS

Instruction Sheet for Persona Twin Blade System, American Safety Razor Co., a Division of Philip Morris, Inc.

*Primary Examiner*—Drayton E. Hoffman
*Assistant Examiner*—David A. Scherbel
*Attorney, Agent, or Firm*—Albert H. Graddis; Jeremiah J. Duggan

[57] ABSTRACT

The specific disclosure provides a dispensing system for razor blade cartridges comprising a dispenser, a plurality of cartridges in the dispenser, and a holder having a plurality of transverse supporting surfaces on top of a frame member for sliding engagement with surfaces extending transversely of each cartridge. The dispenser has a used cartridge storage end comprising a transverse opening between a used cartridge entrance port in one side wall and a holder exit port in the other side wall. A used cartridge is positioned in the used cartridge storage end through the used cartridge entrance port by means of the holder. The frame member of the holder is moved through the transverse opening to abut a side of the used cartridge against wall surfaces forming the holder exit port. Continued movement of the holder disengages the transverse supporting surfaces of the holder from the used cartridge, and such holder surfaces are removed from the storage end through the holder exit port.

11 Claims, 8 Drawing Figures

DISPENSING SYSTEM FOR RAZOR BLADE CARTRIDGES

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of U.S. Pat. application Ser. No. 258,682, filed June 1, 1972, now U.S. Pat. No. 3,771,223 which, in turn, is a continuation-in-part of U.S. Pat. application Ser. No. 236,723, filed Mar. 21, 1972, now U.S. Pat. No. 3,785,051.

BACKGROUND OF THE INVENTION

1. Field of the Invention

The present invention relates to safety razors of a type having at least one blade permanently bonded in a disposable cartridge. More particularly, the present invention relates to a dispenser and a dispensing system which include means for storing used razor blade cartridges.

2. Description of the Prior Art

It is known to permanently bond a razor blade in or on a disposable cartridge which includes a guard surface situated downwardly and outwardly from the cutting edge of the blade. Such cartridges are releasably attached to a handle or holder, and are replaced on the handle when the cutting edge becomes unsuitable for use. For example, U.S. Pat. No. 1,864,995 discloses double edge blades bonded in plastic and metallic cartridges. U.S. Pat. Nos. 2,563,802 and 2,800,713 provide single edge blades permanently secured to plastic or metallic cartridges. U.S. Pat. No. 3,388,831 discloses plastic cartridges with single edge blades, and also cartridge dispensing systems. The dispensers of U.S. Pat. No. 3,388,831 include means for storing used cartridges.

SUMMARY OF THE INVENTION

In accordance with the present invention, there is provided a razor blade cartridge dispenser comprising a used cartridge storage end opposite a cartridge dispensing end. The dispenser is used in a shaving system which comprises a plurality of razor blade cartridges, and a holder. The holder has a plurality of transverse surfaces at an upper end of a frame member. The transverse surfaces are adapted for sliding engagement with transverse slidably engageable surfaces on each cartridge. The storage end of the dispenser includes a used cartridge entrance port formed in a side wall of the dispenser, a holder exit port formed in another side wall opposite the entrance port, and a transverse opening extending between the entrance port and the holder exit port for passage of the holder frame therethrough. The holder exit port is dimensioned to permit passage therethrough of the transverse surfaces on the holder, and to preclude removal of a used cartridge therethrough. The used cartridge is positioned in the used cartridge storage end through the used cartridge entrance port by means of the holder, and the frame member is moved through the transverse opening to remove the holder transverse surfaces through the holder exit port.

The invention provides an improved cartridge storage means which permits a user to safely dispose of used cartridges without handling them.

DESCRIPTION OF SPECIFIC EMBODIMENTS

Figure 1:
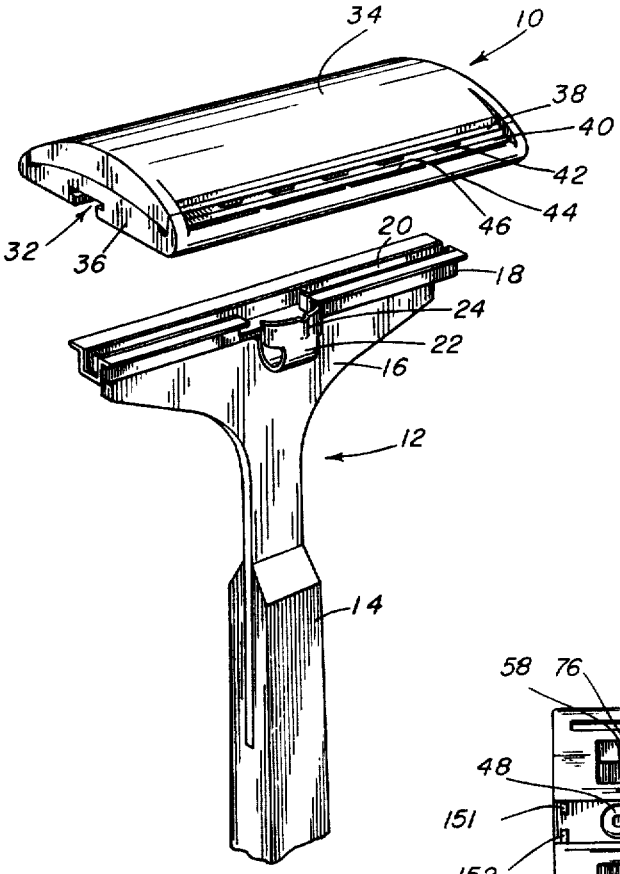
FIG. 1 is an exploded view of a cartridge and a cartridge holder.

FIG. 1 shows an exploded view of a blade cartridge 10 and a cartridge holder 12. The blade cartridge 10 has a pair of double edge blades, 38, 40 bonded permanently between a cap 34 and a blade seat member 36. The blades 38, 40 are maintained in a separated state by a spacer 42. A guard bar 44, 44' is spaced outwardly from opposite longitudinal sides of the blade seat member 36 to provide a plurality of downwardly extending shaving residue channels 46 beneath the cutting edge of the lower blade 40.

The holder 12 includes a handle 14 to which a frame member 16 is secured. Cartridge supporting surfaces shown as a generally U-shaped flanged channel member 18, and a stop and spring member 20 are transversely positioned and secured to an upper end of the frame member 16. The cartridge 10 is removably secured to the holder 12 by sliding the flanged U-shaped member 18 into slidably engageable surfaces shown as a T-shaped channel 32 formed transversely along the underside of the blade seat 36.

Figure 2:
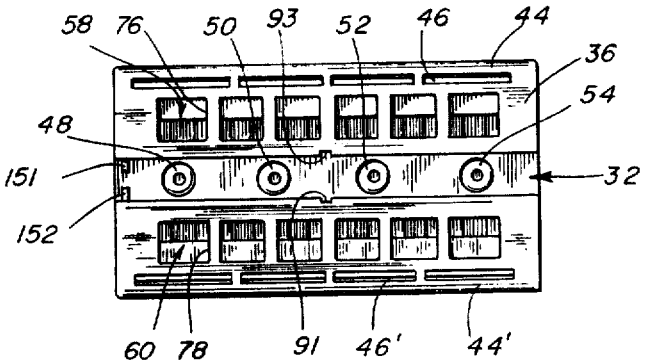
FIG. 2 is a bottom plan view of the cartridge of FIG. 1.
Figure 3:
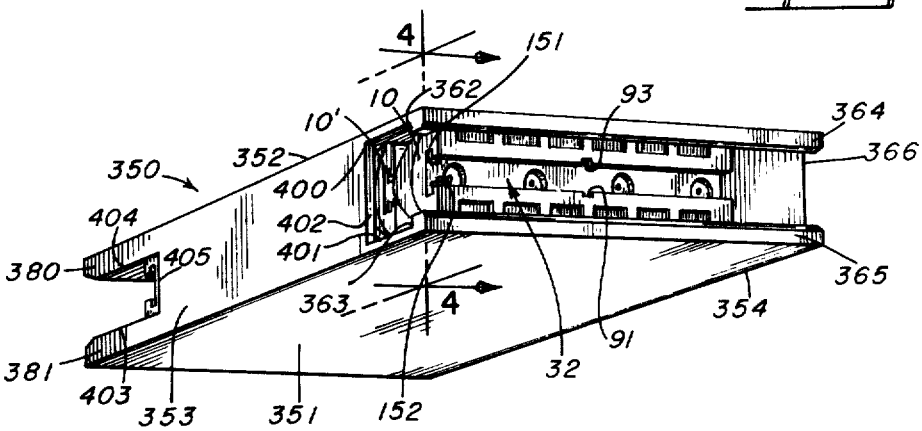
FIG. 3 is a perspective view of a dispenser embodiment.

With reference to FIG. 2, the cap member 34 has a plurality of transversely spaced posts 48, 50, 52, 54 extending downwardly from the lower surface thereof. The posts 48–54 extend through a slot (not shown) in the upper blade 38, apertures (not shown) in the spacer 42, a slot (not shown) in the lower blade 40, and apertures in the blade seat member 36. The bottom portions of the posts 48–54 are staked, for example, by ultrasonic, mechanical or heat energy, to deform the lower ends as shown in FIG. 4, and thereby bond the components of the cartridge 10 together.

The spacer 42 has a plurality of longitudinally extending teeth on each end thereof which protrude a slight distance in front of the cutting edges of the upper blade 38. The teeth have spaces therebetween which are in flow communication with perforations 58, 60 in the lower blade 40. The perforations 58, 60 are in fluid communication with downwardly extending apertures 76, 78 in the blade seat member 36. Shaving residue generated between the cutting edges of the blades 38, 40 passes through flow paths defined by the spaces between the spacer teeth, the perforations 58, 60, and the apertures 76, 78.

With reference to FIG. 2, the T-shaped channel 32 formed in the lower side of the blade seat member 36 has a pair of opposing notches 91, 93 therein. One of the notches 91, 93 receives a detent 24 on a spring 22 of the stop and spring member 20 (FIG. 1) when the cartridge supporting surfaces or U-shaped member 18 is in sliding engagement with the T-shaped channel 32 to minimize the possibility of the cartridge 10 from accidentally sliding off the holder 12.

Figure 4:
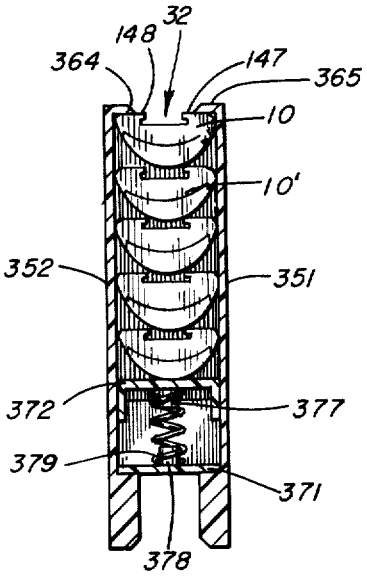
FIG. 4 is a cross-sectional view of the dispenser taken along lines 4—4 of FIG. 3.
Figure 5:
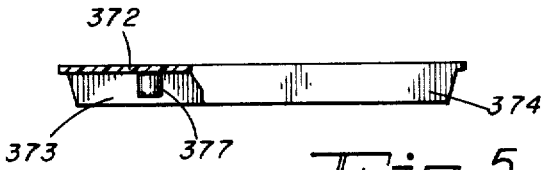
FIG. 5 is a side elevational view of a movable wall for the dispenser with a portion broken away.
Figure 6:
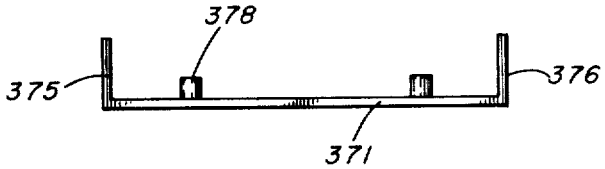
FIG. 6 is a side elevational view of another movable wall of the dispenser.

With reference to FIGS. 3–8, a dispenser 350 has a top wall 352 and an opposing base or bottom wall 351, as well as opposing side walls 353 and 354. A new cartridge dispensing end is formed of opposing inwardly directed flange portions 364, 365 extending transversely of the dispenser 350. As shown in FIG. 4, the cartridges 10, 10' are arranged in abutting relationship in the dispenser 350 and are biased upwardly such that opposing inwardly directed members 147, 148, which define the T-shaped channel 32 of the uppermost cartridge 10 are in abutting engagement with the undersides of the flange portions 364, 365. The cartridges 10, 10' are biased upwardly by a pair of springs 379 (only one shown) extending vertically between a pair of movable walls 371, 372. The upper movable wall 372 has downwardly extending side walls 373, 374 that are in sliding engagement with the inner surfaces of the top and bottom walls 351, 352 of the dispenser 350. Similarly, the bottom movable wall 371 has a pair of opposed upwardly extending wall portions 375, 376 that are positioned in sliding engagement with the interior surfaces of the side walls 353, 354 of the dispenser 350. Each of the springs 379 are vertically positioned and held in vertical alignment by posts 377, 378 which extend in an opposing manner from the upper and lower movable walls 372, 371. The springs 379 preferably should have a sufficient bias to move the lowermost cartridge into an abutting engagement with the inner surfaces of the inwardly directed flange portions 364, 365 while the lower movable wall 371 remains in the position shown in FIG. 4. It is obvious that the biasing means may take other forms than the pair of springs 379. For example, such biasing means may be a single spring having a coiled biasing member at one end thereof and a pair of elongated members extending tangentially from the coiled member and tending to rotate in counter-radial directions about the axis of the coiled member such that the biasing force is applied to the opposing surfaces of the two movable walls 372, 371.

A single guide channel 366 is formed on the upper surface of the side wall 354. When properly orientated, the holder 12 is slid or moved to the left in sliding engagement with the T-shaped channel 32 in the bottom of the cartridge 10 until the detent 24 (FIG. 1) is in abutting engagement with one of the recesses 91, 93 of the cartridge 10.

A new cartridge exiting port is formed in the dispenser side wall 353 by opposing parallel surfaces 400, 401 which are interconnected at the lower end by a surface 402 which is perpendicular to the surfaces 400, 401. Inwardly directed tabs 362, 363 extend in an opposing manner from the opposite surfaces 400, 401 and beneath the flange portions 364, 365. The tabs 362, 363 are sufficiently flexible to permit the passage of the cartridge 10 to the left out of the dispenser 350 by movement of the holder 12 to the left such that the left sides of the flanges on the holder U-shaped channel member 18 are in abutting engagement with stops 151, 152 formed in the left side of the T-shaped channel 32. When the uppermost cartridge 10 is removed from the dispenser 350, the next cartridge 10' is moved into abutting engagement with the undersides of the flange portions 364, 365 by action of the springs 379.

Figure 7:
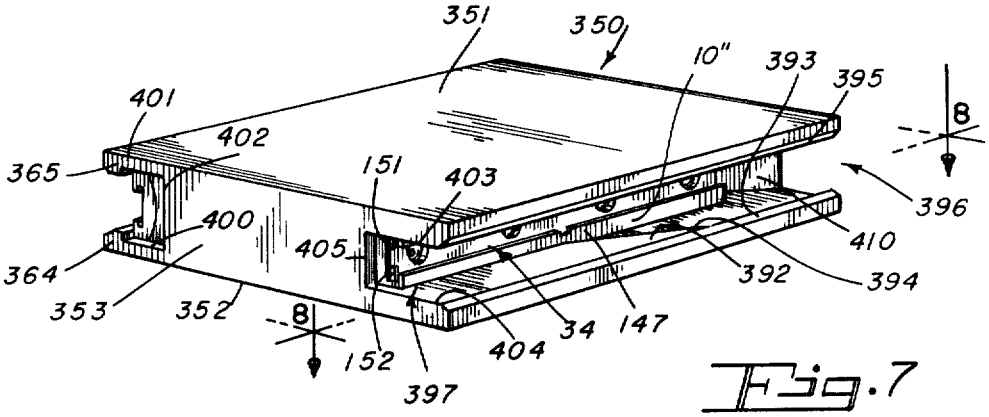
FIG. 7 is another perspective view of the dispenser showing the used cartridge storage end of the dispenser.
Figure 8:
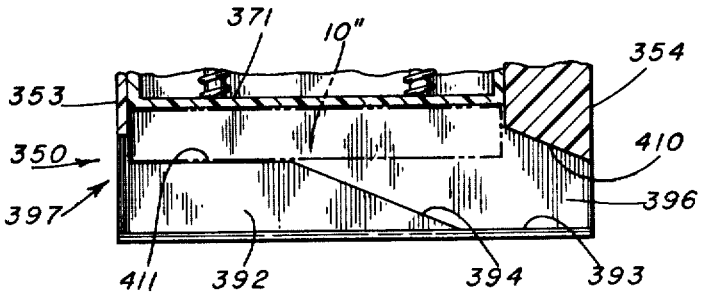
FIG. 8 is a cross-sectional view taken along line 8—8 of FIG. 7 showing the used cartridge storage end of the dispenser.

A used blade end of the dispenser 350 is shown in FIGS. 7 and 8. With reference to FIGS. 7 and 8, the used blade access port 396 has inwardly directed opposing flange members 393, 395. Opposing ramp elements 392 are formed on the inner surfaces of the top and bottom walls 352, 351 (the ramp element of wall 351 is not shown). A used cartridge 10" is inserted through the port 396 above the opposing flange members 393, 395 while the holder 12 is still secured to the cartridge 10". The left side of the cartridge 10" slides up a ramp surface 394 on each of the ramp members 392 and moves the lower movable wall 371 upwardly such that transverse movement of the cartridge 10" to the left as viewed in FIG. 8 can be continued. Transverse movement of the used cartridge 10" is continued until the inwardly directed surfaces 147, 148 defining the T-shaped channel 32 of the used cartridge 10" rest on horizontal surfaces 411 of the ramp members 392, and the used cartridge 10" is in the position as shown in dashed lines in FIG. 8. When a subseqent used cartridge is ready for placement in the used cartridge end of the dispenser, the above procedure is repeated to push the used cartridge 10" upwardly and to locate the subsequent cartridge in the position shown in dashed lines in FIG. 8.

The lower end 410 of the side wall 354 can be sloped or beveled as shown in FIG. 8 to provide relatively free movement of the used cartridge 10" up the ramp surfaces 394 during transmovement thereof into the used cartridge end 396 of the dispenser 350.

When the used cartridge 10" is seated on the horizontal upper surfaces 411 of the ramp members 392, the holder 12 can be removed by transverse movement to the right while maintaining the right side of the used cartridge 10" in abutting engagement with the inner surface of the side wall 354. Alternatively, the stop members 151, 152 can be designed to yield to a pressure on the left side of the U-shaped holder channel member 18, and thus provide for removal of the holder 12 out a port 397 defined by opposing vertical surfaces 403, 404 and a horizontal surface 405 interconnecting the opposing surfaces 403, 404. Further, the stop members 151, 152 can be eliminated and the U-shaped holder channel member 18 can be removed through the port 397 because the left side of the used cartridge 10" is in abutting engagement with an inner surface of the side wall 353 as shown in FIG. 8.

Modifications of the disclosed embodiments of the invention will be obvious to those skilled in the art without departing from the scope and spirit of the present invention. For example, the port defined by surfaces 400, 401, 402 can be eliminated and at least one tab can be substituted for the flange member 364. In this instance, the U-shaped channel member 18 is positioned in the T-shaped channel of the new cartridge 10 as described hereinabove and the new cartridge is thereafter removed by rotating the handle in a clockwise manner as viewed in FIG. 4. Such rotation will disengage the new cartridge 10 from the substituted tab or tabs, and thus permit removal of the cartridge from the dispenser 350.

Although specific embodiments have been described hereinabove with reference to two double edge blades in disposable cartridge, it is obvious that all the aspects of the invention are equally suitable for a dispenser and dispensing system for one or any number of single edge blades bonded in a disposable cartridge or for one or any number of double edge blades bonded in a disposable cartridge. Single edge blade cartridges are disclosed in U.S. Pat. application Ser. Nos. 191,665 and 236,723, filed Oct. 22, 1971, and Mar. 21, 1972, and now U.S. Pat. Nos. 3,783,510 and 3,785,051, respectively. Alternative double edge blade cartridges are shown in U.S. Pat. application Ser. No. 258,682, filed June 1, 1972, now U.S. Pat. No. 3,771,223. U.S. Pat. application Ser. Nos. 191,655, 236,723 and 258,682 are incorporated herein by reference.

What is claimed is:

1. In a razor blade cartridge shaving system comprising a cartridge dispenser, a plurality of razor blade cartridges, and a holder, each of said cartridges including slidably engageable surfaces extending transversely thereof, and said holder including an upwardly extending frame member and a plurality of transverse supporting surfaces at an upper end of said frame member, said transverse supporting surfaces being adapted for sliding engagement with said slidably engageable surfaces; the combination comprising said dispenser including a base wall, a top wall in opposing relationship to said base wall, a pair of opposing side walls interconnecting said base and top walls, a cartridge dispensing end, means at said cartridge dispensing end for releasably maintaining unused ones of said cartridges in said dispenser, and a used cartridge storage end opposite said cartridge dispensing end; said used cartridge storage end comprising a used cartridge entrance port formed in one of said side walls, a holder exit port formed in the other one of said side walls, said holder exit port being dimensioned to permit passage of said transverse supporting surfaces therethrough and to preclude removal of a used cartridge therethrough, and a transverse opening for passage of said frame member therethrough, said transverse opening extending between said used cartridge entrance port and said holder exit port; whereby a used one of said cartridges is positioned in said used cartridge storage end through said used cartridge entrance port by means of said holder, and said frame member is moved through said transverse opening to remove said transverse supporting surfaces through said holder exit port.

2. The system of claim 1 wherein said transverse opening is formed by opposing flanges extending inwardly from said base and top walls.

3. The system of claim 1 wherein said used cartridge storage end further comprises means for spacing said used cartridge from said transverse opening.

4. The system of claim 3 wherein said spacing means comprises a pair of ramp members having said transverse opening therebetween, each of said ramp members including a ramp surface which extends inwardly in the general direction of said cartridge dispensing end and transversely in the general direction of said holder exit port.

5. The system of claim 4 wherein each of said ramp members further includes a used cartridge rest surface between the ramp surface thereof and said holder exit port.

6. The system of claim 1 wherein said dispenser further includes means for biasing said unused cartridges in an abutting arrangement to said cartridge dispensing end with said slidably engageable surfaces of one of said unused cartridges in position for engagement.

7. In a razor blade cartridge shaving system comprising a cartridge dispenser, a plurality of razor blade cartridges, and a cartridge holder, each of said cartridges including at least one double edge blade bonded therein and a plurality of underside surfaces forming a channel transversely thereof, and said holder including an upwardly extending frame member and a plurality of transverse supporting surfaces on top of said frame member, said transverse supporting surfaces being adapted for sliding engagement with said channel surfaces; the combination comprising said dispenser including a base wall, a top wall in opposing relationship to said base wall, a pair of opposing side walls interconnecting said base and top walls, a cartridge dispensing end, means at said cartridge dispensing end for releasably maintaining unused ones of said cartridges in said dispenser, and a used cartridge storage end opposite said cartridge dispensing end; said used cartridge storage end comprising a used cartridge entrance port formed in one of said side walls, a holder exit port formed in the other one of said side walls, said holder exit port being dimensioned to permit passage of said transverse supporting surfaces therethrough and to preclude removal of a used cartridge therethrough, and a transverse opening extending between said used cartridge entrance port and said holder exit port, said transverse opening being formed by opposing flanges extending inwardly from said base and top walls; whereby a used one of said cartridges is positioned in said used cartridge storage end through said used cartridge entrance port by means of said holder, and said frame member is moved through said transverse opening to abut an end of the used cartridge against the side wall about said holder exit port and to remove said transverse supporting surfaces through said holder exit port after disengagement from said channel surfaces on the used cartridge.

8. The system of claim 7 wherein said used cartridge storage end further comprises means for spacing said used cartridge from said transverse opening.

9. The system of claim 8 wherein said spacing means comprises a pair of ramp members having said transverse opening therebetween, each of said ramp members including a ramp surface which extends inwardly in the general direction of said cartridge dispensing end and transversely in the general direction of said holder exit port.

10. The system of claim 9 wherein each of said ramp members further includes a used cartridge rest surface between the ramp surface thereof and said holder exit port.

*11. In a razor blade cartridge dispensing system comprising a cartridge dispenser, and a plurality of razor blade cartridges, each of said cartridges including slidably engageable surfaces extending transversely thereof for receiving a supporting holder; the combination comprising said dispenser including a base wall, a top wall in opposing relationship to said base wall, a pair of opposing side walls interconnecting said base and top walls, a cartridge dispensing end, means at said cartridge dispensing end for releasably maintaining unused ones of said cartridges in said dispenser, and a used cartridge storage end opposite said cartridge dispensing end; said used cartridge storage end comprising a used cartridge entrance port formed in one of said side walls, a holder exit port formed in the other one of said side walls, said holder exit port being dimensioned to preclude removal of a used cartridge therethrough, and a transverse opening extending between said used cartridge entrance port and said holder exit port; whereby a used one of said cartridges is positioned in said used cartridge storage end through said used cartridge entrance port by means of a supporting holder, and the holder is moved through said transverse opening and said holder exit port.*

* * * * *